Patented May 27, 1941

2,243,332

UNITED STATES PATENT OFFICE 2,243,332

SULPHONIC COMPOUND

Martin de Simo, Piedmont, John J. O'Connor, Oakland, and George S. Parsons, Berkeley, Calif., assignors to Shell Development Company, San Francisco, Calif., a corporation of Delaware No Drawing. Application August 29, 1939, Serial No. 292,445

17 Claims. (Cl. 260—513)

This invention relates to sulphonates, that is, free sulphonic acids and derivatives thereof, such, for example, as salts and esters, which may be regarded as derivable therefrom by replacement of the acid hydrogen of a sulphonic group by another atom or group. The invention relates to new compositions of matter, novel methods for producing sulphonates and to the application of the new compositions to many technically important uses.

One object of the invention is the production of a new class of sulphonates having highly advantageous properties. Another object is to produce novel sulphonate mixtures having superior capillary active properties. It is another object of the invention to provide a new method for cheaply producing sulphonates which give high yields of desirable products of high quality. A further object is the application of vinyl type sulphonate-containing compositions as wetting, dispersing, deterging and emulsifying agents.

The new chemical compounds of the invention broadly include sulphonates wherein the sulphur atom of a sulphonic group is directly attached to an olefinic carbon atom in an aliphatic group of at least four carbon atoms, whether such group be an open or closed chain aliphatic group. The vinyl type sulphonates of the invention may thus be considered as derivatives of acyclic and alicyclic hydrocarbons of four or more carbon atoms per molecule having at least one hydrogen atom attached to an olefinc carbon atom in which a hydrogen atom of an olefinic carbon atom has been replaced by a sulphonate group and one or more other hydrogen atoms may or may not have been replaced by aryl, aralkyl, alkaryl, cycloaryl, alicyclic or heterocyclic groups which may be further substituted or by other suitable substituents. A preferred group of the new vinyl type sulphonates is that having at least four carbon atoms in an open chain or preferably 5 to 20 carbon atoms in a straight chain. Especially useful products are the new vinyl type secondary sulphonates particularly those in which the unsaturated carbon atom directly attached to the sulphonated carbon atom is directly attached to at least one other carbon atom and preferably those in which the sulphonated carbon atom is at or near the middle of an open chain of 10 to 20 carbon atoms. Still another highly advantageous group of new vinyl type sulphonates are those corresponding to substitution products of cyclopentene and cyclohexene, preferably alkyl cyclopentenes and alkyl cyclohexenes having at least four or more preferably at least eight carbon atoms in the alkyl group.

The new compositions of the invention offer many advantages over previously prepared sulphonates. They are more soluble in water and organic solvents than the corresponding saturated sulphonates and are much more stable in both acid and alkaline solution than are compounds containing sulphuric ester groups. The vinyl type monosulphonates of the invention, particularly those having eight to twenty carbon atoms per molecule have superior surface active properties and compositions containing the new vinyl type sulphonates are especially advantageuos detergents and wetting agents capable of general use as excellent textile auxiliary agents.

For the preparation of the preferred sulphonate compositions of the present invention the reaction of vicinal dihalides with suitable sulphites is preferably used. A particularly advantageous source of dihalides for use in this reaction is the halogenation of olefinic hydrocarbons in such a manner that only addition of halogen to the double bond takes place and substitution is avoided. The processes of United States Patents 1,952,122, 2,043,932 and 2,099,231 may advantageously be used for the addition of halogen to olefines in the preparation of starting material for the preferred process of the present invention, although other sources of vicinal dihalides may also be used and it is not necessary that the two halogen atoms be the same. While the exact mechanism of the reaction of vicinal dihalides with sulphite compounds in accordance with the process of the invention has not been completely elucidated, examination of the reaction products indicates that only one of the halogen atoms is replaced by a sulphonate group. The reaction for the formation of a vinyl sulphonate may be represented by the following equation:

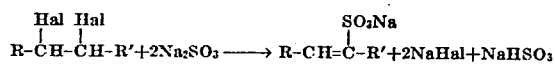

Other sulphites than sodium sulphite may be used including, for example, aluminum, ammonium, barium, calcium, copper, lead, manganese, mercury, potassium, zinc and like sulphites.

The reaction between vicinal dihalides and sulphites may be carried out in aqueous or other suitable solution. Where aqueous solutions of neutral salts of sulphurous acid are used good agitation is desirable in order to promote intimate contact of the water insoluble dihalide with the sulphite. Temperatures of at least 100° C. are advantageous for the reaction and more preferably temperatures of the order of 150° to 300° C., most preferably 200° to 250° C., and superatmospheric pressure are used in order to promote rapid reaction. Intermittent or batch methods of operation may be used although continuos reaction is preferred. In order to avoid loss of sulphurous acid salts, as well as to simplify recovery of the product, the reaction may be carried out with intermittent or continuous addition of base corresponding to the sulphite being used so that the bisulphite formed in the reaction may be converted to neutral sulphite and this in turn reacted with further amounts of dihalide. This may be continued until all the sulphurous acid salt is used up and the solid reaction product is substantially a two-component system of organic sulphonate and halide of the base used. These components may be separated in any suitable manner, e. g. crystallization and/or extraction with suitable solvents for either the sulphonate or the salt, etc. Depending upon the reaction conditions used more or less vicinal hydroxy sulphonate and possibly also some allyl type sulphonate may be present in the product. Such components are usually not detrimental in most of the applications to which the new compositions are suited and the mixed products may be advantageously used for many purposes. But if desired other sulphonates may be separated from the vinyl type sulphonates, for example, by extraction with suitable solvents. Selective precipitation from water or aqueous solvents, or extraction with water in the presence of a water insoluble solvent for the undesired sulphonates, taking advantage of the higher water solubility of vinyl type sulphonate salts, may advantageously be used.

In carrying out the reaction of dihalides with sulphites, particularly sodium sulphite to produce vinyl type sodium sulphonates it is desirable to use an excess of sulphite. With dichlorides a molecular excess of at least 20% and more preferably from about 35% to 100% excess sodium sulphite is advantageous. The sodium sulphite may conveniently be used in the form of an aqueous solution of about 1.5 M. For highest sulphonate yields reaction in the pH range of about 5 to 7, preferably about 6 to 6.5, as measured at 240° C. with tungsten and calomel electrodes, is desirable. After start of the reaction with excess sodium sulphite a feed of equal molecular amounts of dihalide and sodium hydroxide may be continuously added together with the required amount of sodium sulphite.

Dihalides which are particularly suitable for reaction with sulphites in accordance with the preferred method of operation are vicinal disecondary halides, such, for example, as 2,3-dichlorbutane, 2,3-dichlorpentane, 2,3-dichlorhexane, 3,4-dichlorhexane, 3-methyl-2,3-dichlorpentane, 2,3- and 3,4-dichlorheptane, 2-methyl-3,4-dichlorhexane, 4-methyl-2,3-dichlorhexane, 2,2-dimethyl-3,4-dichlorpentane, 2,3-dimethyl-4,5-dichlorhexane, 2,5-dimethyl-3,4-dichlorhexane and higher homologues and the corresponding bromides and/or iodides, etc. Cyclic dihalides which may also advantageously be used include for example, 1,2 dichlorcyclopentane and 1,2 dichlorcyclohexane and derivatives thereof having saturated or unsaturated aliphatic groups, particularly alkyl groups, attached to one or more of the unchlorinated carbon atoms, as 4-methyl-1,2-dichlorcyclohexane, 3,4- and 4,5-dimethyl-1,2-dichlorcyclohexane, 4-isopropyl-1,2-dichlorcyclohexane, 3-methyl-5-tertiary butyl-1,2-dichlorcyclohexane, 4-pentadecyl-1,2-dichlorcyclohexane and the like. Vicinal primary-secondary dihalides, although usually giving lower yields of sulphonates when reacted with aqueous sodium sulphite, may also be used. The reaction may be carried out using individual dihalides or mixtures thereof, with or without compounds which may be inert or which may react with the sulphite or undergo other reaction without interfering with the production of the desired sulphonate or sulphonates.

Another suitable method for producing the novel vinyl type sulphonates of the invention is the oxidation of a compound having a sulphur atom to which less than three oxygen atoms are attached directly joined to an olefinic carbon atom in an aliphatic group of at least four carbon atoms. Thus vinyl type mercaptans such, for example, as 1-butenethiol, 2-methyl-1-pentenethiol, 1,2-dimethyl-1-hexenethiol, 1-methyl-1-(2,2-dimethyl) propyl-ethenethiol, and the like may be oxidized to the corresponding vinyl type sulphonates having a sulphonic acid group in place of the sulphhydro group. Vinyl type disulphides, whether symmetrical or not, of which di-isobutenyl-disulphide, 1-butenyl methyl disulphide and the like are typical, may be similarly oxidized to produce vinyl type sulphonic acids. Vinyl sulphinic acids may also be used. The oxidation is preferably carried out with nitric acid although hydrogen peroxide, potassium dichromate, potassium permanganate or other suitable oxidizing agents may be used. For the nitric acid oxidation of vinyl type mercaptans, temperatures of about 40° to 80° C. are preferred. Less preferred methods for the preparation of the vinyl type sulphonates are the dehydration of the corresponding hydroxy sulphonates and the dehydrohalogenation of vicinal halosulphonates.

The vinyl type sulphonic acids of the invention having at least four carbon atoms in the aliphatic group to which the sulphonic acid group is attached may be used as the free acids for many purposes but generally they are most useful in the form of their salts which may be formed by neutralization of the free acids with suitable basic acting agents or in the form of the esters of the sulphonic acids which may conveniently be prepared, for example, by reacting sulphonic acid chlorides with alcoholates corresponding to the alcohol of the desired ester. The alkali and alkaline earth metal and nitrogen base salts are particularly useful salts. Thus for example, the ammonium, sodium, potassium, calcium, and magnesium salts are useful where the new vinyl type sulphonates are to be used as wetting agents and the like. The copper, mercury and lead salts have valuable insecticidal and fungicidal uses. Amine salts such as may be prepared from dimethyl amine, ethylamine, butylamine, diethanolamine, glucamine, methyl glucamine, pyridine, piperidine, aniline, toluidine, cyclohexylamine etc. have especially valuable properites. Esters, such for example, as the methyl, ethyl, propyl, isopropyl, allyl, methallyl, normal-, iso, secondary- and tertiary- butyl, oleyl, cyclohexyl, myristyl, phenyl ethyl, cinnamyl, phthalyl, furfuryl, diacetone, glycol, glycerine and like esters of vinyl type sulphonic acids form another group of valuable sulphonates within the scope of the invention.

The new compositions of the invention may be used in a purified form such, for example, as may be obtained by crystallization of the sulphonate or sulphonate mixture from alcohol or other suitable solvent, or as less pure products. Thus crude products containing inorganic salts such as sodium chloride, sodium sulphite or sodium bisulphite or other salts and/or organic compounds which may or may not be sulphonates, acquired in the course of manufacture or added thereafter, may be advantageously used for many purposes. The new compositions may be applied in the form of solutions in water, alcohol, acetone or other suitable solvents or as pastes, suspensions or emulsions whether aqueous or not, or as anhydrous materials.

The following examples, which are not to be construed as limitative, illustrate the preparation of novel sulphonate compositions within the scope of the invention by the preferred method using vicinal dihalides as starting material.

*Example I*

A mixture of vicinal dichlorides was produced by chlorinating at 0° to —10° C. an olefinic fraction derived from vapor phase cracking of paraffin wax and substantially composed of straight chain olefines with an average molecular weight of about 170, i. e., averaging about 12 carbon atoms per molecule, and comprising preponderantly olefines having the double bond at least once removed from the terminal carbon atom. After about 30 grams of chlorine was added to 100 grams of the olefines the reaction was interrupted and the crude product distilled. A fraction boiling from 105° to 115° C. at 3 mm. Hg pressure was found to have an average mol weight of 240 and contained 27.2% chlorine.

126 grams of this dichloride, 227 grams of Na₂SO₃ and 750 grams of water were heated in a chromium-lined autoclave under good agitation for five hours at 215 to 218° C. After the heating approximately 88% of the water-insoluble dichloride layer disappeared, due to having been converted to water-soluble sulphonate. On analyzing the aqueous layer, it was found that 90.3% of the available chlorine reacted and some 50.3% of the total available chlorine was replaced by sulphonate.

After fractional crystallization and purification a water-soluble product was obtained that analyzed 80% of sulphonate and 20% inorganic salts. The product showed reactivity to bromine to indicate the sulphonate to be a mixture of more than 70% unsaturated sulphonate, predominately vinyl sulphonate and 30% or less of vicinal hydroxy sulphonate.

The sulphonates showed the following surface tension-reducing properties in aqueous solution as compared with the corresponding twelve carbon atom saturated secondary sulphonate:

| Conc. of sulphonate in distilled water, percent | Surface tension by the ring method dynes/cm. | |
| --- | --- | --- |
| | Sulphonate from C₁₂ dichloride | Saturated secondary sulphonate |
| 1.0 | 29.6 | 32.6 |
| 0.5 | 28.6 | 32.7 |
| 0.25 | 29.5 | 44.6 |
| 0.10 | 30.4 | 56.8 |
| 0.05 | 34.0 | 64.4 |
| 0.025 | 37.5 | 67.0 |
| 0.010 | 44.3 | 71.5 |
| 0 | 72.0 | 72.0 |

The aqueous solution showed also considerable wetting property as measured by the time necessary for wetting a 1" diameter No. 6 canvas disc sufficiently to sink into the solution.

| Conc. of sulphonate in distilled water, percent | Temperature | Time |
| --- | --- | --- |
| | Degrees | Seconds |
| Water | 50 | 1898 |
| 0.20 | 50 | 24.8 |
| 0.10 | 50 | 49.0 |
| 0.05 | 50 | 154.4 |
| Water | 90 | 30.5 |
| 0.20 | 90 | 5.2 |
| 0.10 | 90 | 6.5 |
| 0.05 | 90 | 10.7 |

*Example II*

An olefine cut with an average mol weight of 213 (C₁₅) derived from the vapor phase cracking of paraffin wax was chlorinated in a CCl₄ solution at —16° to —18° C. After adding 29 grams chlorine per 100 grams of hydrocarbon, the chlorination was interrupted and the product distilled. A cut boiling between 138° and 145° C. at 3 mm. Hg pressure had an average chlorine content of 24.5%.

A mixture of 3.2 grams of the vicinal dichloride obtained, 5.0 grams Na₂SO₃ and 25 grams water were heated in a sealed glass tube for 3 hours at 220° C. After heating, more than 80% of the water-insoluble layer disappeared, having been converted to water-soluble sulphonate. Analysis of the aqueous layer indicated that 91% of the available chlorine reacted and some 44.8% of the total chlorine was replaced by the sulphonate group. Dilute aqueous solutions of the mixed hydroxy and vinyl sulphonates produced wet cotton fibers very rapidly.

*Example III*

Pure cetene-1 was prepared from cetyl alcohol by dehydration with P₂O₅. A pure fraction of this olefine was chlorinated in CCl₄ solution with a solution of chlorine in CCl₄ at —30° C. After adding the theoretical amount of chlorine to form the desired dichloride, the product was fractionated and a cut boiling between 147° and 153° C. at 3 mm. Hg pressure was taken for the sulphonation.

A mixture of the 1,2-dichlorcetane with 2.83 mols of NaSO₃ and water was heated in a sealed tube for three hours at 260° C. Analysis of the product showed that 69.3% of the available chlorine had reacted and that the yield of the sulphonates was 33% of the theoretical based on dichlorcetane reacted. The sulphonate product is a detergent and a good wetting agent for cotton fibers.

Example IV

A series of different vicinal dihalides of 4 to 14 carbon atoms per molecule were reacted with sodium sulphite in a manner analogous to those used in the foregoing examples.

| Dichloride used | Reaction temp. | Reaction time | Percent of total available chlorine reacted | Percent of total available chlorine replaced by SO$_3$Na | Monosulphonate production percent of theoretical based on dichloride reacted |
|---|---|---|---|---|---|
| | °C. | Hours | | | |
| 2, 3-dichlorbutane | 200 | 3 | 77.5 | 36.9 | 95.2 |
| Vicinal disecondary dichloroctane | 210 | 4 | 80.1 | 33.6 | 83.9 |
| Vicinal disecondary dichlordecane | 210 | 2¾ | 73.7 | 36.3 | 98.5 |
| C$_{13}$ cracked wax olefine dichlorides | 244 | 4 | 87.5 | 39.9 | 91.2 |
| Dichloraddition products of cracked wax olefines of 202 mol weight | 220 | 3 | 89.9 | 49.7 | |

The sulphonates described in the specific examples are straight chain compounds representing a particularly advantageous, commercially available, species of the novel compositions of the invention. The invention is not limited to such compounds, however, and the following list is illustrative of some of the other typical types of vinyl sulphonates within the scope of the invention: 1-isopropyl-1-propenesulphonic acid, 1,3-dimethyl-1-butenesulphonic acid, 1-(1-methyl) propyl-1-propenesulphonic acid, 1,4-dimethyl-1-pentenesulphonic acid, 2-methyl-1-isopropyl-1-propene sulphonic acid, 1,2,3-trimethyl-1-propene sulphonic acid, 2,4,4-trimethyl-1-pentenesulphonic acid, 1-(2,2-dimethyl) propyl-1-propenesulphonic acid, 1-(1-ethyl) propyl-ethenesulphonic acid, 1-butyl-4-ethyl-1-hexenesulphonic acid, 1-(2 methyl) propyl-4-ethyl-1-octenesulphonic acid, 4-ethyl-1-(3-ethyl) pentyl-1-hexenesulphonic acid, 4-isobutyl-1-cyclohexenesulphonic acid. There are many other vinyl type sulphonates which may be included in this invention. The particular configuration and size of molecule may be varied to suit the requirements of the use to which the vinyl type sulphonate is to be put. Thus for use as wetting agents salts of vinyl type sulphonates of fairly large molecular weight, preferably having at least eight or more, preferably 10 to 20 carbon atoms per molecule, are desirable, while as mercerizing assistants vinyl type sulphonates of lower molecular weight, e. g., having 5 to 12 carbon atoms, preferably in an open chain, are suitable. The vinyl type sulphonates of the invention having the sulphonate group at or near the center of a carbon chain are more soluble in water and other solvents than the corresponding sulphonates having the sulphonate group at the end of the chain. The branched chain vinyl type sulphonates are also more soluble than those having the same number of carbon atoms in a straight chain. The new compositions of the invention which exhibit great surface activity are in general, also highly stable in both acid and alkaline media. These properties make them particularly suitable for a wide variety of uses, especially in the processing and improvement of natural and synthetic textile materials and in the production and application of dyes and coloring materials, where the requirements are exacting. Thus vinyl type sulphonates of the invention, particularly in the form of salts, are useful in carbonization, fulling, finishing, mercerizing, delustering or lustering, degumming, kier boiling, scouring, stripping and felting fibrous materials of all kinds and for dyeing, particularly in acid or alkaline baths or reserving cotton in such baths, as well as in the production of pigments of basic or acid vat or azo or sulphur dyes or inorganic pigments in a finely divided form. Those having from 8 to 30, preferably 12 to 20, carbon atoms in an aliphatic chain are valuable detergents and may be used as cleansing agents adapted for use in hard water and for removing fatty or oily materials not only from vegetable and animal fibers but also for cleansing the skin and for use in dentifrices generally. As textile assistants vinyl type sulphonates are also useful in sizing, impregnating, mordanting, weighing or loading and oiling or lubricating, softening, stiffening, waterproofing, mildewproofing and dyeing, for example, cellulose acetate, with insoluble dyes. Other uses for which the novel compositions of the invention are adapted include, the breaking of petroleum emulsions whether of natural occurrence or formed in the handling or processing of petroleum, in acid treating or flooding oil wells, in flotation processes including froth flotation of minerals and the recovery of oil from oil sands, in tanning and softening particularly fat liquid treating, hides and skins, for dissolving, emulsifying or dispersing liquid and solid water insoluble substances such as hydrocarbons, higher alcohols, fats, oils, waxes, resins and the like and as components of lubricating oils and greases.

The novel compositions of the invention may be applied to foregoing or other suitable uses either in a pure or standardized form or in conjunction with other suitable processing or treating agents including other surface active compounds, such for example, as other types of sulphonates or suitable sulphuric acid ester salts or fatty acid ester soaps. Many widely different embodiments of this invention may be made without departing therefrom and it is to be understood that the invention is not limited by any theory proposed in explanation of the improved results attained nor to specific embodiments thereof except as defined in the appended claims.

We claim as our invention:

1. A sodium salt of a secondary aliphatic monosulphonic acid containing at least eight and less than 21 carbon atoms in a straight hydrocarbon chain having the sulphur atom of the sulphonate group directly attached to a carbon atom to which a double bond at least once removed from the terminal carbon atom is also attached.

2. An alkali salt of a secondary aliphatic monosulphonic acid containing at least four carbon atoms in an open hydrocarbon chain having the sulphur atom of the sulphonate group directly attached to an olefinic carbon atom at least once removed from the end of the carbon chain.

3. A salt of an aliphatic monosulphonic acid containing at least four carbon atoms per molecule having the sulphur atom of the sulphonic group directly attached to an olefinic carbon atom.

4. A nitrogen base salt of an aliphatic sulphonic acid containing at least four carbon atoms per molecule having the sulphur atom of the sulphonic group directly attached to an olefinic carbon atom.

5. An ester of a sulphonic acid containing at least four carbon atoms in an aliphatic hydrocarbon chain having the sulphur atom of a sulphonate group directly attached to an olefinic carbon atom.

6. A monosulphonated aliphatic hydrocarbon containing at least four carbon atoms per molecule having the sulphur atom of the sulphonic group directly attached to a carbon atom to which a double bond at least once removed from the end of the chain is also attached.

7. A monosulphonated aliphatic hydrocarbon containing at least four carbon atoms per molecule having the sulphur atom of the sulphonic group directly attached to a secondary olefinic carbon atom.

8. A monosulphonated aliphatic hydrocarbon containing at least four carbon atoms per molecule having the sulphur atom of the sulphonic group directly attached to an olefinic carbon atom.

9. A monosulphonated hydrocarbon having the sulphur atom of the sulphonic group directly attached to an olefinic carbon atom in an aliphatic group of at least four carbon atoms.

10. An aliphatic sulphonate containing at least four carbon atoms per molecule having the sulphur atom of a sulphonic group directly attached to an olefinic carbon atom.

11. A sulphonate having the sulphur atom of a sulphonic group directly attached to an olefinic carbon atom in an open chain of at least four carbon atoms.

12. A sulphonate having the sulphur atom of a sulphonic group directly attached to an olefinic carbon atom in an aliphatic group of at least four carbon atoms.

13. The sulphonate reaction product of a vicinal dihalide having at least four carbon atoms in an aliphatic chain and a dibasic salt of a strong base and sulphurous acid.

14. The sulphonate reaction product of a vicinal disecondary halide having at least four carbon atoms in an open chain and a dibasic salt of a strong base and sulphurous acid.

15. The mixed sodium sulphonates obtainable by reacting sodium sulphite with an aliphatic vicinal dihalide having at least four carbon atoms per molecule.

16. A process for producing a sulphonate which comprises reacting a vicinal dihalide having at least four carbon atoms in an aliphatic chain with an alkali sulphite at a temperature between about 100° C. and the decomposition temperature of said halide.

17. A process for producing a sulphonate which comprises reacting a vicinal dihalide having at least four carbon atoms in an aliphatic chain with a molecular excess of sodium sulphite at a temperature between about 150° and 250° C.

MARTIN DE SIMO.
JOHN J. O'CONNOR.
GEORGE S. PARSONS.